(12) United States Patent
Meislitzer et al.

(10) Patent No.: US 11,414,208 B2
(45) Date of Patent: Aug. 16, 2022

(54) HEALTH MONITORING OF OZONE CONVERTER

(71) Applicant: BOMBARDIER INC., Dorval (CA)

(72) Inventors: Boris Meislitzer, Pointe-Claire (CA); Carlos Pereira Lima, Pointe-Claire (CA)

(73) Assignee: BOMBARDIER INC., Dorval (CA)

( * ) Notice: Subject to any disclaimer, the term of this patent is extended or adjusted under 35 U.S.C. 154(b) by 250 days.

(21) Appl. No.: 16/769,604

(22) PCT Filed: Dec. 3, 2018

(86) PCT No.: PCT/CA2018/051540
§ 371 (c)(1),
(2) Date: Jun. 4, 2020

(87) PCT Pub. No.: WO2019/109172
PCT Pub. Date: Jun. 13, 2019

(65) Prior Publication Data
US 2021/0171213 A1    Jun. 10, 2021

Related U.S. Application Data

(60) Provisional application No. 62/594,051, filed on Dec. 4, 2017.

(51) Int. Cl.
*B64D 45/00* (2006.01)
*B64D 13/06* (2006.01)
(Continued)

(52) U.S. Cl.
CPC ............. *B64D 45/00* (2013.01); *B64D 13/06* (2013.01); *B01D 53/30* (2013.01);
(Continued)

(58) Field of Classification Search
CPC ...................................................... B64D 45/00
See application file for complete search history.

(56) References Cited

U.S. PATENT DOCUMENTS 6,289,277 B1    9/2001  Feyereisen et al.
8,706,320 B2    4/2014  Keim
(Continued)

OTHER PUBLICATIONS

International Searching Authority, International Search Report and Written Opinion dated Feb. 13, 2019 re: International Application No. PCT/CA2018/051540.
(Continued)

*Primary Examiner* — Joseph H Feild
*Assistant Examiner* — Pameshanand Mahase
(74) *Attorney, Agent, or Firm* — Norton Rose Fulbright Canada LLP

(57) ABSTRACT

A system and method for determining a remaining useful life of an ozone converter of an aircraft are disclosed. The method comprises using flight data of the aircraft and location-based ozone exposure data to determining a cumulative ozone exposure for the ozone converter. The cumulative ozone exposure and a predetermined ozone exposure capacity of the ozone converter are used to determine a remaining useful life of the ozone converter. Based on the determined remaining useful life of the ozone converter, an indication that the ozone converter is approaching an end-of-useful-life condition is provided.

28 Claims, 4 Drawing Sheets

(51) Int. Cl.
  *B01D 53/30* (2006.01)
  *B64F 5/40* (2017.01)
  *B64F 5/60* (2017.01)
  *F24F 8/98* (2021.01)
  *C01B 13/10* (2006.01)
  *F24F 11/30* (2018.01)
  *B01D 53/86* (2006.01)

(52) U.S. Cl.
  CPC .. *B01D 53/8675* (2013.01); *B64D 2013/0685* (2013.01); *B64D 2045/0085* (2013.01)

(56) References Cited

U.S. PATENT DOCUMENTS

| | | |
|---|---|---|
| 9,133,028 B2 | 9/2015 | Army et al. |
| 2006/0155432 A1 | 7/2006 | Brown |
| 2014/0308171 A1* | 10/2014 | Army ............... B64D 13/00 422/120 |
| 2015/0090114 A1* | 4/2015 | Au ............... B03C 9/00 96/18 |
| 2017/0283083 A1* | 10/2017 | Behbahani-Pour ...... A62C 3/08 |
| 2017/0296965 A1* | 10/2017 | Schaeffer ............. G05B 19/406 |

OTHER PUBLICATIONS

Porter Perkins, An Automated Atmospheric Sampling System Operating on 747 Airliners, NASA Technical Memorandum, International Conference on Environmental Sensing and Assessment, Sep. 14-19, 1975, United States.

Peter Dias-Lalcaca et al., An Automated System for the Measurement of Nitrogen Oxides and Ozone Concentrations from a Passenger Aircraft: Instrumentation and First Results of the NOXAR Project, Environmental Science & Technology, Sep. 4, 1998, pp. 3228-3236, vol. 32, No. 20, American Chemical Society, United States.

Seema Bhangar et al., Ozone Levels in Passenger Cabins of Commercial Aircraft on North American and Transoceanic Routes, Environmental Science & Technology, Apr. 19, 2008, pp. 3938-3943, vol. 41, No. 11, American Chemical Society, United States.

* cited by examiner

HEALTH MONITORING OF OZONE CONVERTER

CROSS-REFERENCE TO RELATED APPLICATION(S)

This application is a national phase application under 35 U.S.C. 371 of International Patent Application No. PCT/CA2018/051540 filed on Dec. 3, 2018, which claims priority from U.S. Provisional Patent Application Ser. No. 62/594,051 filed on Dec. 4, 2017, the entire content of which is incorporated herein by reference.

TECHNICAL FIELD

The disclosure relates generally to aircraft, and more particularly to ozone converters of aircraft.

BACKGROUND

It can be advantageous for aircraft to fly at higher altitudes to reduce fuel consumption and enjoy the benefits of less turbulence. One drawback associated with flying at higher altitudes is the presence of ozone at higher concentrations in the upper atmosphere. Ozone is considered a contaminant for aircraft cabins since it can cause physical ailments to occupants of the cabin. Accordingly, aircraft certification authorities impose limits for ozone content in passenger cabins of aircraft.

In order to meet the requirements set by the certification authorities, some aircraft are equipped with ozone converters as part of their bleed air or environmental control systems. An ozone converter is typically a catalytic device that ensures that an ozone concentration inside a passenger cabin of an aircraft does not exceed a safe level during flight of the aircraft through airspace having a higher ozone concentration level. The performance of ozone converters can degrade over time so it is important to either replace or refurbish such ozone converters before their ozone conversion performance becomes inadequate. Existing maintenance procedures for ozone converters can sometime result in prematurely replacing or refurbishing such ozone converters and incurring maintenance costs.

SUMMARY

In one aspect, the disclosure describes a method for monitoring an ozone converter of an aircraft and performing an associated maintenance operation. The method comprises:

using flight data of the aircraft and location-based ozone exposure data, determining a cumulative ozone exposure for the ozone converter;

using the cumulative ozone exposure and a predetermined ozone exposure capacity of the ozone converter, determining a remaining useful life of the ozone converter; and replacing or refurbishing the ozone converter based on the determined remaining useful life of the ozone converter.

The flight data may be indicative of an aircraft location and the method may comprise associating the aircraft location with a corresponding ozone exposure level corresponding to the aircraft location to increment the cumulative ozone exposure.

The method may comprise using the flight data and the location-based ozone exposure data to increment the cumulative ozone exposure based on an exposure time at a corresponding ozone exposure level.

The method may comprise using the flight data and the location-based ozone exposure data to:

associate a plurality of past aircraft locations with respective corresponding ozone exposure levels corresponding to the past aircraft locations;

associate a corresponding exposure time with each ozone exposure level; and determine the cumulative ozone exposure for the ozone converter based on the ozone exposure levels and the respective corresponding exposure times.

The method may comprise using an integral function to determine the cumulative ozone exposure for the ozone converter.

The method may comprise generating a maintenance trigger when the determined remaining useful life of the ozone converter equals or is below a maintenance trigger threshold.

The method may comprise using substantially real-time flight data to increment the cumulative ozone exposure.

The method may comprise receiving the location-based ozone exposure data via an ozone concentration sensor onboard the aircraft.

The location-based ozone exposure data may be predetermined and the method may comprise accessing a database containing the location-based ozone exposure data.

The method may comprise generating an indication that the ozone converter is approaching an end-of-useful-life condition before replacing or refurbishing the ozone converter.

Embodiments can include combinations of the above features.

In another aspect, the disclosure describes a method for determining and indicating a remaining useful life of an ozone converter of an aircraft. The method comprises:

using flight data of the aircraft and location-based ozone exposure data, determining a cumulative ozone exposure for the ozone converter;

using the cumulative ozone exposure and a predetermined ozone exposure capacity of the ozone converter, determining a remaining useful life of the ozone converter; and providing an indication that the ozone converter is approaching an end-of-useful-life condition based on the determined remaining useful life of the ozone converter.

The flight data may be indicative of an aircraft location and the method may comprise associating the aircraft location with a corresponding ozone exposure level corresponding to the aircraft location to increment the cumulative ozone exposure.

The method may comprise using the flight data and the location-based ozone exposure data to increment the cumulative ozone exposure based on an exposure time at a corresponding ozone exposure level.

The method may comprise using the flight data and the location-based ozone exposure data to:

associate a plurality of past aircraft locations with respective corresponding ozone exposure levels corresponding to the past aircraft locations;

associate a corresponding exposure time with each ozone exposure level; and determine the cumulative ozone exposure for the ozone converter based on the ozone exposure levels and the respective corresponding exposure times.

The method may comprise using an integral function to determine the cumulative ozone exposure for the ozone converter.

The indication may include a maintenance trigger provided when the determined remaining useful life of the ozone converter equals or is below a maintenance trigger threshold.

The method may comprise using substantially real-time flight data to increment the cumulative ozone exposure.

The method may comprise receiving the location-based ozone exposure data via an ozone concentration sensor onboard the aircraft.

The location-based ozone exposure data may be predetermined and the method may comprise accessing a database containing the location-based ozone exposure data.

Embodiments can include combinations of the above features.

In a further aspect, the disclosure describes a system for determining and indicating a remaining useful life of an ozone converter of an aircraft. The apparatus comprises:

one or more data processors; and non-transitory machine-readable memory operatively coupled to the one or more data processors, storing instructions executable by the one or more data processors and configured to cause the one or more data processors to:

using flight data of the aircraft and location-based ozone exposure data, determine a cumulative ozone exposure for the ozone converter;

using the cumulative ozone exposure and a predetermined ozone exposure capacity of the ozone converter, determine a remaining useful life of the ozone converter; and generate an output for causing an indication that the ozone converter is approaching an end-of-useful-life condition based on the remaining useful life of the ozone converter.

The flight data may be indicative of an aircraft location and the instructions may be configured to cause the one or more data processors to associate the aircraft location with a corresponding ozone exposure level corresponding to the aircraft location to increment the cumulative ozone exposure.

The instructions may be configured to cause the one or more data processors to use the flight data and the location-based ozone exposure data to increment the cumulative ozone exposure based on an exposure time at a corresponding ozone exposure level.

The instructions may be configured to cause the one or more data processors to use the flight data and the location-based ozone exposure data to:

associate a plurality of past aircraft locations with respective corresponding ozone exposure levels corresponding to the past aircraft locations;

associate a corresponding exposure time with each ozone exposure level; and determine the cumulative ozone exposure for the ozone converter based on the ozone exposure levels and the respective corresponding exposure times.

The instructions may be configured to cause the one or more data processors to use an integral function to determine the cumulative ozone exposure for the ozone converter.

The indication may include a maintenance trigger provided when the determined remaining useful life of the ozone converter equals or is below a maintenance trigger threshold.

The instructions may be configured to cause the one or more data processors to use substantially real-time flight data to increment the cumulative ozone exposure.

The system may comprise an ozone concentration sensor and the instructions are configured to cause the one or more data processors to use the location-based ozone exposure data sensed using the ozone concentration sensor.

The location-based ozone exposure data may be predetermined and the instructions are configured to cause the one or more data processors to receive the location-based ozone exposure data from a database.

Embodiments can include combinations of the above features.

Further details of these and other aspects of the subject matter of this application will be apparent from the detailed description included below and the drawings.

DESCRIPTION OF THE DRAWINGS

Reference is now made to the accompanying drawings, in which.

DETAILED DESCRIPTION

The following disclosure relates to a system and method for health monitoring of ozone converters of aircraft. In some embodiments, the method disclosed herein can comprise monitoring the usage/loading (e.g., cumulative ozone exposure) of an ozone converter and determining the remaining useful life of the ozone converter based on the usage/loading specific to the particular ozone converter. The methods disclosed herein can include providing an indication that the ozone converter is approaching an end-of-useful-life condition based on the determined remaining useful life of the ozone converter. The indication can serve to trigger a maintenance operation tailored to at least partially restore the ozone conversion performance of the ozone converter. In some situations, the method and system disclosed herein can help avoid prematurely replacing or refurbishing ozone converters and thereby help make use of more of the useful life of ozone converters and reduce maintenance costs associated with ozone converters of aircraft. For example, instead of using a fixed number of flight hours between maintenance intervals of an ozone converter, the system and method disclosed herein can permit the maintenance intervals to be adjusted on demand based on actual usage/loading of the ozone converter.

Aspects of various embodiments are described through reference to the drawings.

Figure 1:
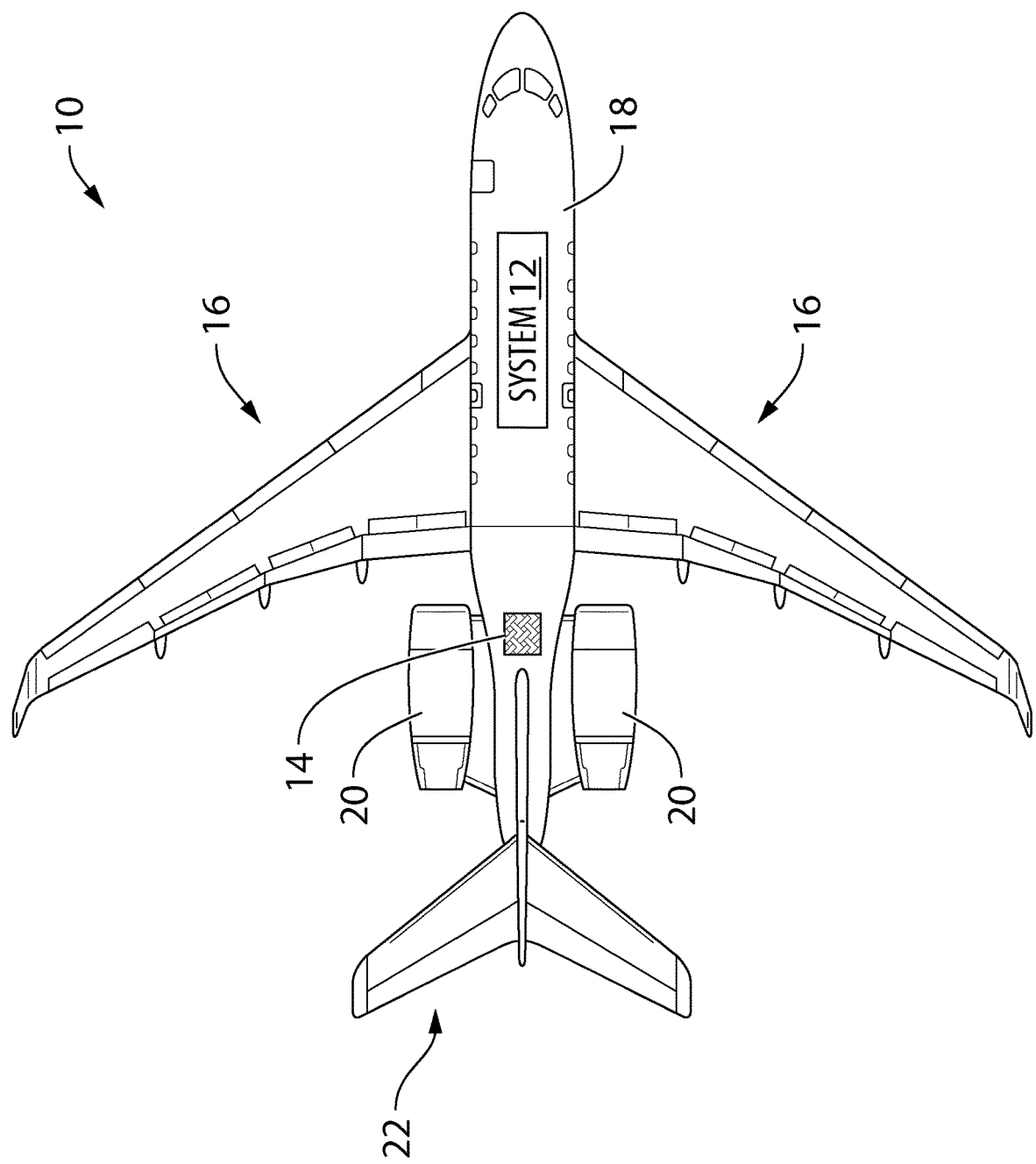
FIG. 1 is a top plan view of an exemplary aircraft comprising a system for monitoring the health of an ozone converter of the aircraft.

FIG. 1 is a top plan view of an exemplary aircraft 10 comprising system 12 for monitoring the health of ozone converter 14 of aircraft 10. Aircraft 10 can be any type of aircraft such as corporate (e.g., business jet), private, commercial and passenger aircraft suitable for civil aviation. For example, aircraft 10 can be a narrow-body, twin-engine jet airliner or may be an ultra-long range business jet. Aircraft 10 can be a fixed-wing aircraft. Aircraft 10 can comprise wings 16, fuselage 18, one or more engines 20 and empennage 22.

Even though system 12 is illustrated as being part of aircraft 10, it is understood that system 12 or part(s) thereof do not need to be part of aircraft 10. For example, system 12 or part(s) thereof could alternatively be located off of aircraft 10. For example, system 12 or part(s) thereof could be implemented on a portable electronic device (e.g. a laptop or tablet) that is part of a flight crew's electronic flight bag, or could be implemented using a computing device of a ground station (i.e., a ground-based tool) that permits a ground-based (e.g., maintenance) personnel to monitor the health of ozone converter 14 remotely from aircraft 10. For example, it is understood that relevant information could be transmitted from aircraft 10 to a location remote from aircraft 10 (e.g., ground station) in order to be used by an individual or system 12 at such location in accordance with aspects of the present disclosure.

Figure 2:
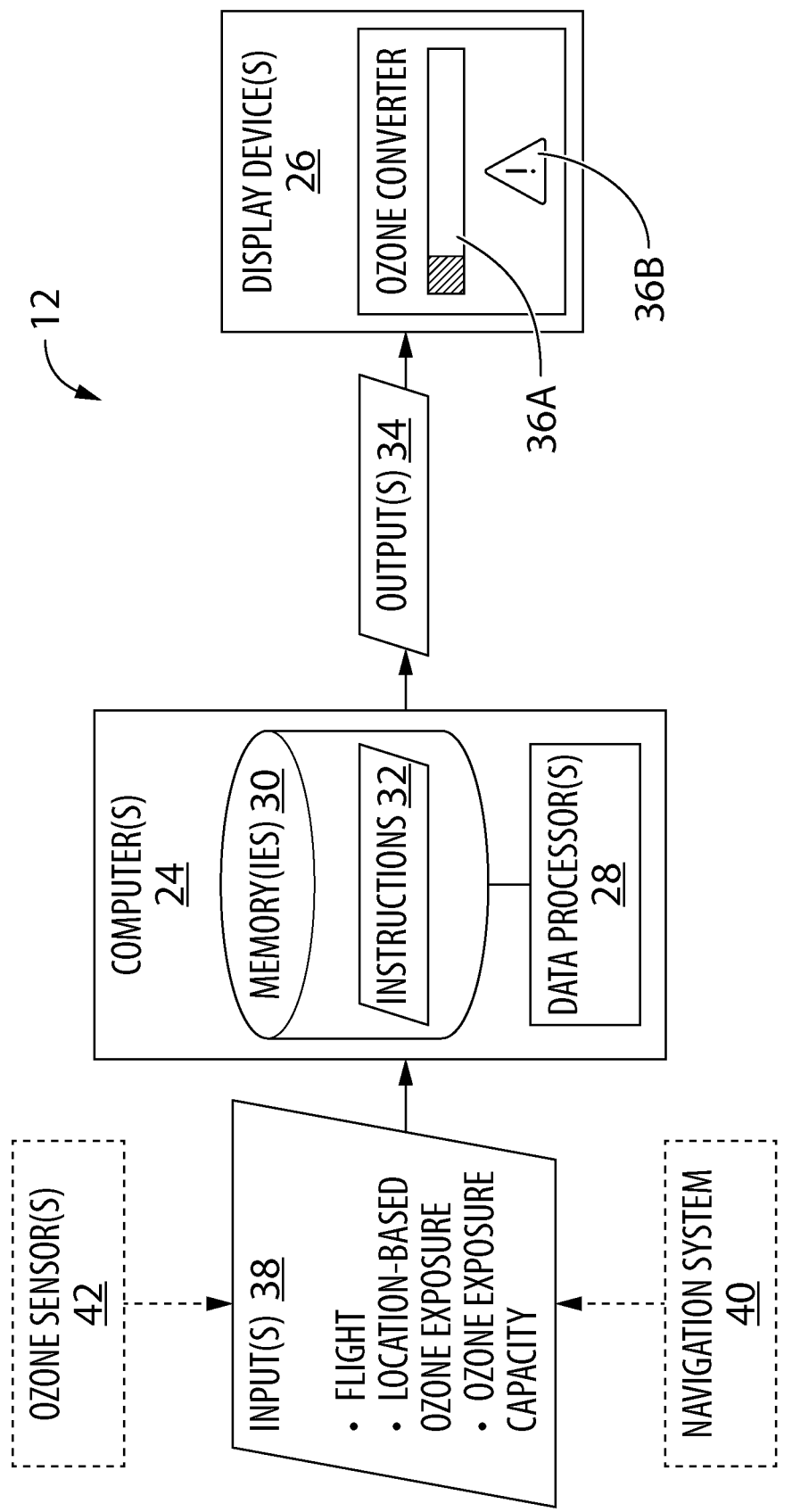
FIG. 2 is a schematic representation of an exemplary system for monitoring the health of the ozone converter of the aircraft of FIG. 1.

FIG. 2 is a schematic representation of an exemplary system 12 for monitoring the health of ozone converter 14 of aircraft 10. In various embodiments system 12 can be integrated with a health monitoring system or other avionics component(s) of aircraft 10, or can be separate from aircraft 10. System 12 can comprise one or more computers 24 (referred hereinafter in the singular) operatively coupled to one or more display devices 26 (referred hereinafter in the singular) of a flight deck of aircraft 10 for example. Alternatively, display device 26 could be part of a portable electronic device (e.g., electronic flight bag) or could be located at a ground station for use by maintenance personnel.

Computer 24 can comprise one or more data processors 28 (referred hereinafter in the singular) and one or more computer-readable memories 30 (referred hereinafter in the singular) storing machine-readable instructions 32 executable by data processor 28 and configured to cause data processor 28 to generate one or more outputs 34 (referred hereinafter in the singular). Output 34 can comprise one or more signals for causing display device 26 of aircraft 10 to display one or more indications 36A, 36B indicative of a health status of ozone converter 14. Output 34 can comprise one or more signals for generating any suitable type (e.g., visual, graphical, text-based, aural) of communication or alert/warning to the appropriate individual(s) or device(s).

Indications 36A and/or 36B can be indicative of ozone converter 14 approaching an end-of-useful-life condition based on the remaining useful life of ozone converter 14. For example, indication 36A can indicate the remaining useful life of ozone converter 14 and have the form of a progress bar or of a suitable analog gauge indicator for example.

Indication 36B can have the form of an alert provided to relevant personnel (e.g., maintenance personnel or pilot of aircraft 10) indicating that an end-of-useful-life condition of ozone converter 14 is approaching. Indication 36B can serve as a maintenance trigger for a suitable maintenance operation associated with ozone converter 14. Such maintenance operation can vary depending on the type of ozone converter 14 and can include the replacement or refurbishment of ozone converter 14 for example.

Computer 26 can receive input(s) 38 in the form of data or information that can be processed by data processor 28 based on instructions 32 in order to generate output 34. For example, input 38 can comprise information that can be used to evaluate the remaining useful life of ozone converter 14 based on specific usage/loading. While input 38 is illustrated as being received at computer 24, it is understood that some or all the data of input 38 could instead be stored in memory 30 of computer 24 prior to the execution of the method disclosed herein. Input 38 can include flight data associated with aircraft 10, location-based ozone exposure data and an ozone exposure capacity associated with ozone converter 14.

The flight data can include a flight history of aircraft 10 since the last replacement or refurbishment of ozone converter 14 and such historical flight data can be used to evaluate the cumulative ozone exposure of ozone converter 14. The flight data can include parameters such as dates, locations (e.g., latitudes and longitudes), routes, altitudes, speeds, durations and waypoints associated with prior flights of aircraft 10. The flight data can be obtained via navigation system 40 of aircraft 10, which can also include a global positioning system (GPS). In some embodiments, the flight data can include a current location of aircraft 10 when the cumulative ozone exposure of ozone converter 14 is incremented substantially in real-time during the operation of aircraft.

The location-based ozone exposure data can include ozone concentration levels in the atmosphere at different locations and altitudes. For example, the location-based ozone data can include ozone concentrations by time of year, world zone, latitude/longitude and altitude. Location-based ozone exposure data can be meteorological data obtained from a meteorological service organization and can be in the form of one or more electronic look-up tables that can be stored in memory 30 or that can be otherwise accessible to computer 24. The location-based ozone exposure data can be obtained in bulk, stored in a database and then accessed as needed by computer 24. Alternatively, up-to-date location-based ozone exposure data that is relevant to the location(s) of aircraft 10 can be provided to computer 24 as needed via wireless communication to aircraft 10 for example.

Alternatively or in addition, location-based ozone exposure data can be acquired substantially in real-time onboard aircraft 10 via one or more ozone concentration sensors 42 for example. Sensor(s) 42 can be configured and located to sense an ozone concentration level inside the passenger cabin of aircraft 10 and/or outside of aircraft 10 in order to provide an indication of the current ozone exposure level of ozone converter 14. The sensed ozone concentration data can then be associated with corresponding exposure times so that the cumulative ozone exposure of ozone converter 14 can be incremented accordingly.

The ozone exposure capacity can be a performance specification of ozone converter 14 and can represent a maximum cumulative ozone exposure after which the ozone conversion performance of ozone converter 14 becomes inadequate. In other words, the ozone exposure capacity can be based on a predetermined amount degradation in the ozone converting performance of ozone converter 14. The ozone exposure capacity can be determined experimentally or by simulation and could be provided by the manufacturer of ozone converter 14. The ozone exposure capacity can serve as a threshold against which the actual cumulative ozone exposure of ozone converter 14 can be compared in order to evaluate the remaining useful life of ozone converter 14.

Data processor 28 can comprise any suitable device(s) configured to cause a series of steps to be performed by computer 24 so as to implement a computer-implemented process such that instructions 32, when executed by computer 24 or other programmable apparatus, can cause the functions/acts specified in the methods described herein to be executed. Memory 30 can comprise any suitable known or other non-transitory machine-readable storage medium. Memory 30 can include a suitable combination of any type of computer memory that is located either internally or externally to computer 24. Memory 30 can comprise any storage means (e.g. devices) suitable for retrievably storing machine-readable instructions 32 executable by data processor 28.

Various aspects of the present disclosure can be embodied as apparatus, devices, methods and/or computer program products. Accordingly, aspects of the present disclosure can take the form of an entirely hardware embodiment, an entirely software embodiment or an embodiment combining software and hardware aspects. Furthermore, aspects of the present disclosure can take the form of a computer program product embodied in one or more non-transitory computer readable medium(ia) (e.g., memory 30) having computer readable program code (e.g., instructions 32) embodied thereon. The computer program product can, for example, be executed by computer 24 to cause the execution of one or more methods disclosed herein in entirety or in part. It is understood that, based on the present disclosure, one skilled in the relevant arts could readily write computer program code for implementing the methods disclosed herein.

Figure 3:
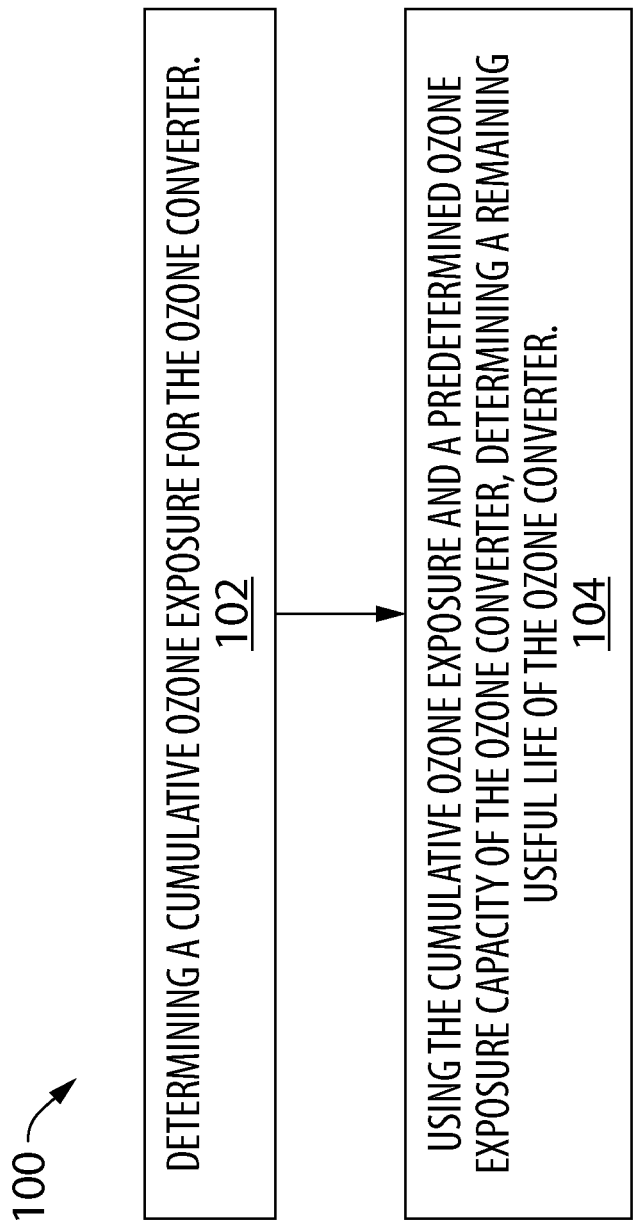
FIG. 3 is flow diagram illustrating a method for monitoring the health of the ozone converter of the aircraft of FIG. 1.

FIG. 3 is flow diagram illustrating a method 100 for monitoring the health of ozone converter 14 of aircraft 10. Method 100 can be performed using system 12 or using other suitable systems. Aspects of system 12 described herein are also applicable to method 100. The following description of method 100 is presented in reference to reference numerals illustrated in FIG. 3. Method 100 can comprise:

using flight data of aircraft 10 and location-based ozone exposure data, determining a cumulative ozone exposure for ozone converter 14 (see block 102); and using the cumulative ozone exposure and a predetermined ozone exposure capacity of ozone converter 14, determining a remaining useful life of the ozone converter (see block 104).

In some embodiments, method 100 can be used to determine and indicate a remaining useful life of ozone converter 14. Accordingly, method 100 can comprise providing one or more indications 36A, 36B that ozone converter 14 is approaching an end-of-useful-life condition based on the determined remaining useful life of ozone converter 14.

In some embodiments, method 100 can be used to monitor usage/loading of ozone converter 14 of aircraft 10 and perform an associated maintenance operation. Accordingly, method 100 can comprise replacing or refurbishing ozone converter 10 based on the determined remaining useful life of ozone converter 14. The maintenance operation can be tailored to at least partially restore the ozone conversion performance of ozone converter 14.

As explained above, the flight data can be indicative of a location of aircraft 10 and method 100 can comprise associating the location of aircraft 10 with a corresponding ozone exposure level corresponding to the location of aircraft 10 from the location-based ozone exposure data. The flight data and the location-based ozone exposure data can be used to increment the cumulative ozone exposure of ozone converter 14 based on an exposure time at the corresponding ozone exposure level. In some embodiments, incrementing the cumulative ozone exposure of ozone converter 14 can be carried out progressively with the operation of the aircraft 10 based on the (e.g., GPS) location(s) of aircraft 10 and the corresponding ozone exposure level(s). In some embodiments, incrementing the cumulative ozone exposure can be carried out substantially continuously and in real-time so that indication 36A of the actual up-to-date remaining useful life of ozone converter 14 can be provided. In some embodiments, indication 36B can be provided when the determined remaining useful life of ozone converter 14 equals or is below a maintenance trigger threshold. Indication 36B can be configured to serve as trigger for a suitable maintenance operation.

In some embodiments of method 100, the determination of the cumulative exposure level can be carried out periodically or as needed using the applicable historical flight data of aircraft 10 and corresponding location-based ozone exposure data. For example, method 100 can comprise: associating a plurality of past aircraft locations with respective corresponding ozone exposure levels corresponding to the past aircraft locations; associating a corresponding exposure time with each ozone exposure level; and determining the cumulative ozone exposure for the ozone converter based on the ozone exposure levels and the respective corresponding exposure times.

As explained above the location-based ozone exposure data can be provided via ozone concentration sensor(s) 42 onboard aircraft 10. Alternatively or in addition, the location-based ozone exposure data can be predetermined and obtained via a meteorological service and method 100 can comprise receiving or accessing applicable values from a database containing the location-based ozone exposure data.

Figure 4:
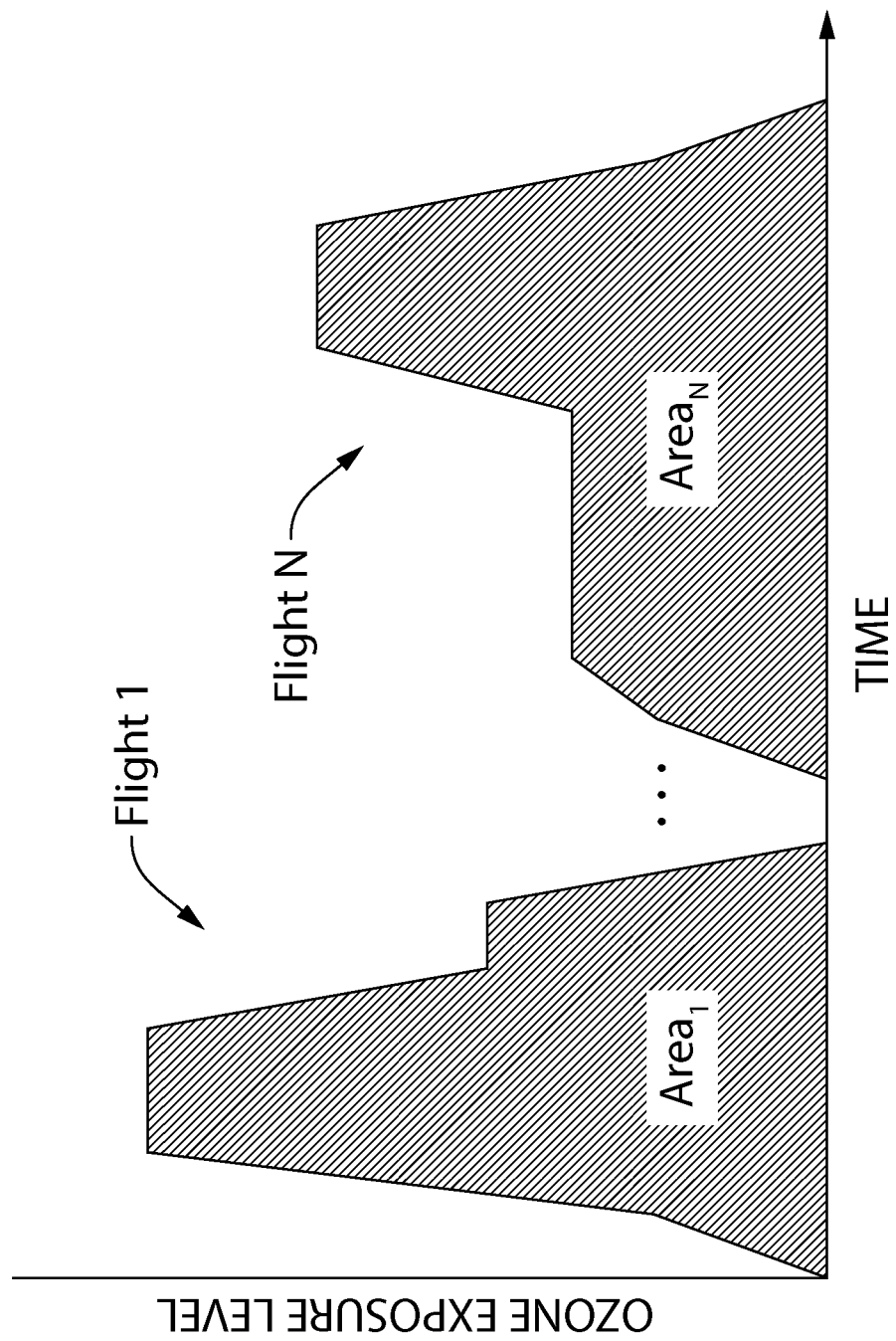
FIG. 4 is a plot of exemplary ozone exposure levels with respect to time for the ozone converter of the aircraft of FIG. 1.

FIG. 4 is a plot of exemplary ozone exposure levels with respect to time for ozone converter 14 of aircraft 10. In some embodiments, ozone exposure levels can be expressed as an ambient ozone concentration in the atmosphere surrounding aircraft 10 for example. The plot of FIG. 4 illustrates an exemplary ozone exposure profile for a first flight (Flight 1) since a previous refurbishment or replacement of ozone converter 14, and an exemplary ozone exposure profile for a last flight (Flight N) since the previous refurbishment or replacement of ozone converter 14. It is understood that additional flights with similar or different ozone exposure profiles could exist between Flight 1 and Flight N. The ozone exposure profiles of different flights can be different depending on the flight data (e.g., route, altitude, speed) and on the corresponding location-based ozone exposure data.

Any suitable algorithm (e.g., counter) can be used to increment or compute the cumulative ozone exposure of ozone converter 14. In some embodiments, a suitable weight function (e.g., weighted sum) can be used in determining the cumulative ozone exposure on ozone converter 14. In some embodiments, a suitable integral function can be used. For example, the area under the curve of the ozone exposure profile for each flight (e.g., Area 1 . . . Area N) can be determined using a suitable integral function and then added together to get a cumulative ozone exposure level from Flight 1 to Flight N. For example, the cumulative ozone exposure of ozone converter can be expressed using equation 1 below. In some embodiments, the cumulative exposure level can therefore be expressed in terms of ozone concentration×exposure time.

$$\Sigma_{i=1}^{N} \text{Area}_i \quad (1)$$

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A method for monitoring an ozone converter of an aircraft and performing an associated maintenance operation, the method comprising:
    using flight data of the aircraft and location-based ozone exposure data, determining a cumulative ozone exposure for the ozone converter;
    using the cumulative ozone exposure and a predetermined ozone exposure capacity of the ozone converter, determining a remaining useful life of the ozone converter; and
    replacing or refurbishing the ozone converter based on the determined remaining useful life of the ozone converter.

2. The method as defined in claim 1, wherein the flight data is indicative of an aircraft location and the method comprises associating the aircraft location with a corresponding ozone exposure level corresponding to the aircraft location to increment the cumulative ozone exposure.

3. The method as defined in claim 1, comprising using the flight data and the location-based ozone exposure data to increment the cumulative ozone exposure based on an exposure time at a corresponding ozone exposure level.

4. The method as defined in claim 1, comprising using the flight data and the location-based ozone exposure data to:
    associate a plurality of past aircraft locations with respective corresponding ozone exposure levels corresponding to the past aircraft locations;
    associate a corresponding exposure time with each ozone exposure level; and
    determine the cumulative ozone exposure for the ozone converter based on the ozone exposure levels and the respective corresponding exposure times.

5. The method as defined in claim 1, to comprising using an integral function to determine the cumulative ozone exposure for the ozone converter.

6. The method as defined in claim 1, comprising generating a maintenance trigger when the determined remaining useful life of the ozone converter equals or is below a maintenance trigger threshold.

7. The method as defined in claim 1, comprising using substantially real-time flight data to increment the cumulative ozone exposure.

8. The method as defined in claim 1, comprising receiving the location-based ozone exposure data via an ozone concentration sensor onboard the aircraft.

9. The method as defined in claim 1, wherein the location-based ozone exposure data is predetermined and the method comprises accessing a database containing the location-based ozone exposure data.

10. The method as defined in claim 1, comprising generating an indication that the ozone converter is approaching an end-of-useful-life condition before replacing or refurbishing the ozone converter.

11. A method for determining and indicating a remaining useful life of an ozone converter of an aircraft, the method comprising:
    using flight data of the aircraft and location-based ozone exposure data, determining a cumulative ozone exposure for the ozone converter;
    using the cumulative ozone exposure and a predetermined ozone exposure capacity of the ozone converter, determining a remaining useful life of the ozone converter; and
    providing an indication that the ozone converter is approaching an end-of-useful-life condition based on the determined remaining useful life of the ozone converter.

12. The method as defined in claim 11, wherein the flight data is indicative of an aircraft location and the method comprises associating the aircraft location with a corresponding ozone exposure level corresponding to the aircraft location to increment the cumulative ozone exposure.

13. The method as defined in claim 11, comprising using the flight data and the location-based ozone exposure data to increment the cumulative ozone exposure based on an exposure time at a corresponding ozone exposure level.

14. The method as defined in claim 11, comprising using the flight data and the location-based ozone exposure data to:
    associate a plurality of past aircraft locations with respective corresponding ozone exposure levels corresponding to the past aircraft locations;
    associate a corresponding exposure time with each ozone exposure level; and
    determine the cumulative ozone exposure for the ozone converter based on the ozone exposure levels and the respective corresponding exposure times.

15. The method as defined in claim 11, comprising using an integral function to determine the cumulative ozone exposure for the ozone converter.

16. The method as defined in claim 11, wherein the indication includes a maintenance trigger provided when the determined remaining useful life of the ozone converter equals or is below a maintenance trigger threshold.

17. The method as defined in claim 11, comprising using substantially real-time flight data to increment the cumulative ozone exposure.

18. The method as defined in claim 11, comprising receiving the location-based ozone exposure data via an ozone concentration sensor onboard the aircraft.

19. The method as defined in claim 11, wherein the location-based ozone exposure data is predetermined and the method comprises accessing a database containing the location-based ozone exposure data.

20. A system for determining and indicating a remaining useful life of an ozone converter of an aircraft, the apparatus comprising:
    one or more data processors; and
    non-transitory machine-readable memory operatively coupled to the one or more data processors, storing instructions executable by the one or more data processors and configured to cause the one or more data processors to:
        using flight data of the aircraft and location-based ozone exposure data, determine a cumulative ozone exposure for the ozone converter;
        using the cumulative ozone exposure and a predetermined ozone exposure capacity of the ozone converter, determine a remaining useful life of the ozone converter; and
        generate an output for causing an indication that the ozone converter is approaching an end-of-useful-life condition based on the remaining useful life of the ozone converter.

21. The system as defined in claim 20, wherein the flight data is indicative of an aircraft location and the instructions are configured to cause the one or more data processors to associate the aircraft location with a corresponding ozone exposure level corresponding to the aircraft location to increment the cumulative ozone exposure.

22. The system as defined in claim 20, wherein the instructions are configured to cause the one or more data processors to use the flight data and the location-based ozone exposure data to increment the cumulative ozone exposure based on an exposure time at a corresponding ozone exposure level.

23. The system as defined in claim 20, wherein the instructions are configured to cause the one or more data processors to use the flight data and the location-based ozone exposure data to:
- associate a plurality of past aircraft locations with respective corresponding ozone exposure levels corresponding to the past aircraft locations;
- associate a corresponding exposure time with each ozone exposure level; and
- determine the cumulative ozone exposure for the ozone converter based on the ozone exposure levels and the respective corresponding exposure times.

24. The system as defined in claim 20, wherein the instructions are configured to cause the one or more data processors to use an integral function to determine the cumulative ozone exposure for the ozone converter.

25. The system as defined in claim 20, wherein the indication includes a maintenance trigger provided when the determined remaining useful life of the ozone converter equals or is below a maintenance trigger threshold.

26. The system as defined in claim 20, wherein the instructions are configured to cause the one or more data processors to use substantially real-time flight data to increment the cumulative ozone exposure.

27. The system as defined in claim 20, comprising an ozone concentration sensor and the instructions are configured to cause the one or more data processors to use the location-based ozone exposure data sensed using the ozone concentration sensor.

28. The system as defined in claim 20, wherein the location-based ozone exposure data is predetermined and the instructions are configured to cause the one or more data processors to receive the location-based ozone exposure data from a database.

\* \* \* \* \*